(12) United States Patent
Wheeler

(10) Patent No.: US 7,614,177 B1
(45) Date of Patent: Nov. 10, 2009

(54) MODIFIED LIGHTED FISHING POLE

(76) Inventor: Gary Edward Wheeler, Rt 4, Box 376-C, Broken Arrow, OK (US) 74014

( * ) Notice: Subject to any disclaimer, the term of this patent is extended or adjusted under 35 U.S.C. 154(b) by 748 days.

(21) Appl. No.: 10/899,352

(22) Filed: Jul. 26, 2004

Related U.S. Application Data

(60) Provisional application No. 60/490,770, filed on Jul. 29, 2003.

(51) Int. Cl.
*A01K 87/00* (2006.01)
(52) U.S. Cl. ........................................ 43/17.5
(58) Field of Classification Search .................. 43/17.5, 43/18.1
See application file for complete search history.

(56) References Cited

U.S. PATENT DOCUMENTS

| | | | | |
|---|---|---|---|---|
| 5,276,990 A | * | 1/1994 | Ramirez | ..................... 43/17.5 |
| 5,347,741 A | * | 9/1994 | Konrad | |
| 5,644,864 A | * | 7/1997 | Kelly | ........................ 43/17.5 |
| 5,826,366 A | * | 10/1998 | Matibe | ...................... 43/17.5 |
| 6,061,946 A | * | 5/2000 | Toelken | ..................... 43/17.5 |
| 6,122,853 A | * | 9/2000 | Genous-Moore | ........... 43/17.5 |
| 6,405,475 B1 | * | 6/2002 | Wallace et al. | ............... 43/17.5 |
| 6,446,380 B1 | * | 9/2002 | Radosavljevic et al. | ........ 43/17 |
| 6,789,348 B1 | * | 9/2004 | Kneller et al. | ............... 43/17.5 |

\* cited by examiner

*Primary Examiner*—T. Nguyen
(74) *Attorney, Agent, or Firm*—Brent A. Capehart; Bowers Law Firm

(57) ABSTRACT

The present invention is directed toward an illuminated fishing pole having an elongated hollow fishing rod having a free end and a fixed end. An elongated hollow handle having a forward end secured to the fixed end of the rod, and a butt end. A light source which is contained within the elongated hollow handle projects light toward and through the elongated hollow fishing rod. The fishing rod can be made from a transparent or clear, flexible material.

5 Claims, 6 Drawing Sheets

MODIFIED LIGHTED FISHING POLE

REFERENCE TO PENDING APPLICATIONS

This application is based on U.S. Provisional Patent Application No. 60/490,770 entitled THUNDER LIGHT FISHING POLE filed Jul. 29, 2003.

REFERENCE TO MICROFICHE APPENDIX

This application is not referenced in any microfiche appendix.

BACKGROUND OF THE INVENTION

1. Field of the Invention

The present invention is generally directed toward an fishing pole used in night or low light fishing and the method to make same, more specifically the present invention is directed toward the illuminating fishing pole and the method to make same 2. Background When fishing it is necessary to see the end of the fishing pole so that a fisherman will be alerted as to when a fish has been attracted by it associated bait or lure. At night, this is problematic. Prior attempts have been made help illuminate the area around the fishing pole. These efforts included fires on the bank and lanterns. Further, devices were attached to the pole, such as small illuminating devices attached to the tips of poles, bobbers that glow.

Some of the difficulties with the prior art devices is that they were bulky, were unstable or unreliable. Thus, there is a need for an improved illuminated fishing pole.

BRIEF SUMMARY OF THE INVENTION

The present invention satisfies the needs discussed above. The present invention is generally directed toward providing light used in a fishing pole for illumination more specifically, toward an improved illuminating light used in a fishing pole.

One aspect of the present invention discloses a fishing pole having a hollow interior and a light source contained in its butt end. When the light source is activated, the resulting light illuminates the hollow fishing pole.

One aspect of the hollow fishing pole discloses a pole made from a clear plastic or fiberglass material. The material can be made from various colors or of a clear material.

One aspect of the butt end discloses a removable end having a compartment for batteries, light bulb and an on/off switch. The butt end can be threadedly secured to the fishing pole. The butt end can be completely removable or can have a removable cap to allow access to the battery chamber. The light bulb is positioned such that the light emitted therefrom is directed toward the hollow fishing pole. Further, it can be a standard bulb, LED light, or other similar light source.

Upon reading the above description, various alternative embodiments will become obvious to those skilled in the art. These embodiments are to be considered within the scope and spirit of the subject invention, which is only to be limited by the claims which follow and their equivalents.

DETAILED DESCRIPTION OF THE PREFERRED EMBODIMENTS

Figure 1:
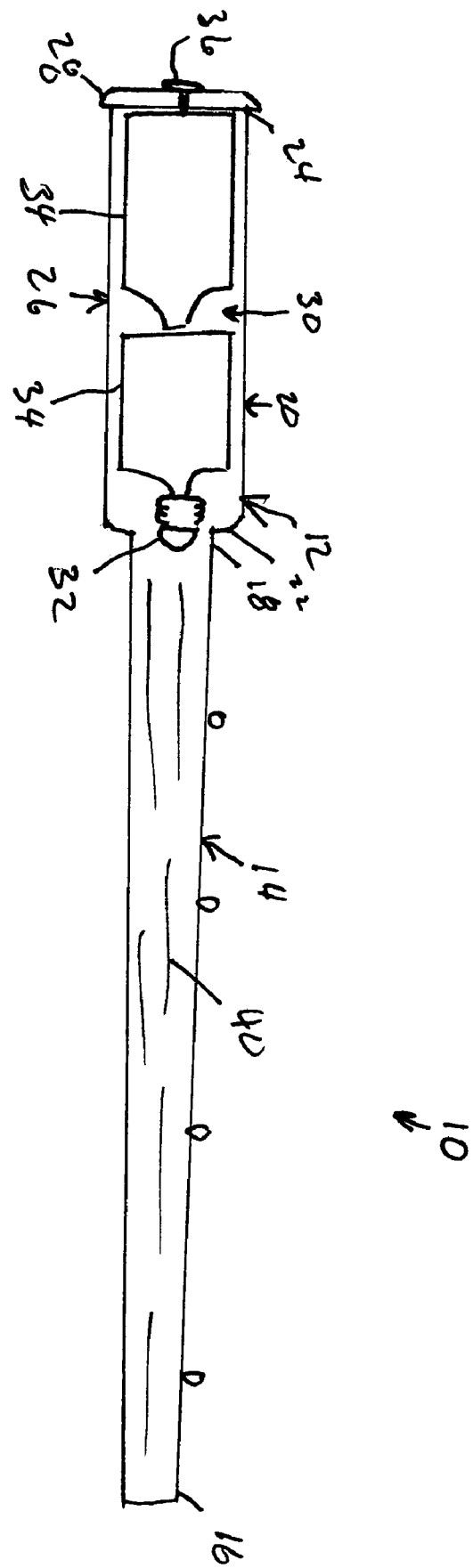
FIG. 1 is a prospective, cut-away view of an embodiment of the present invention
Figure 2:
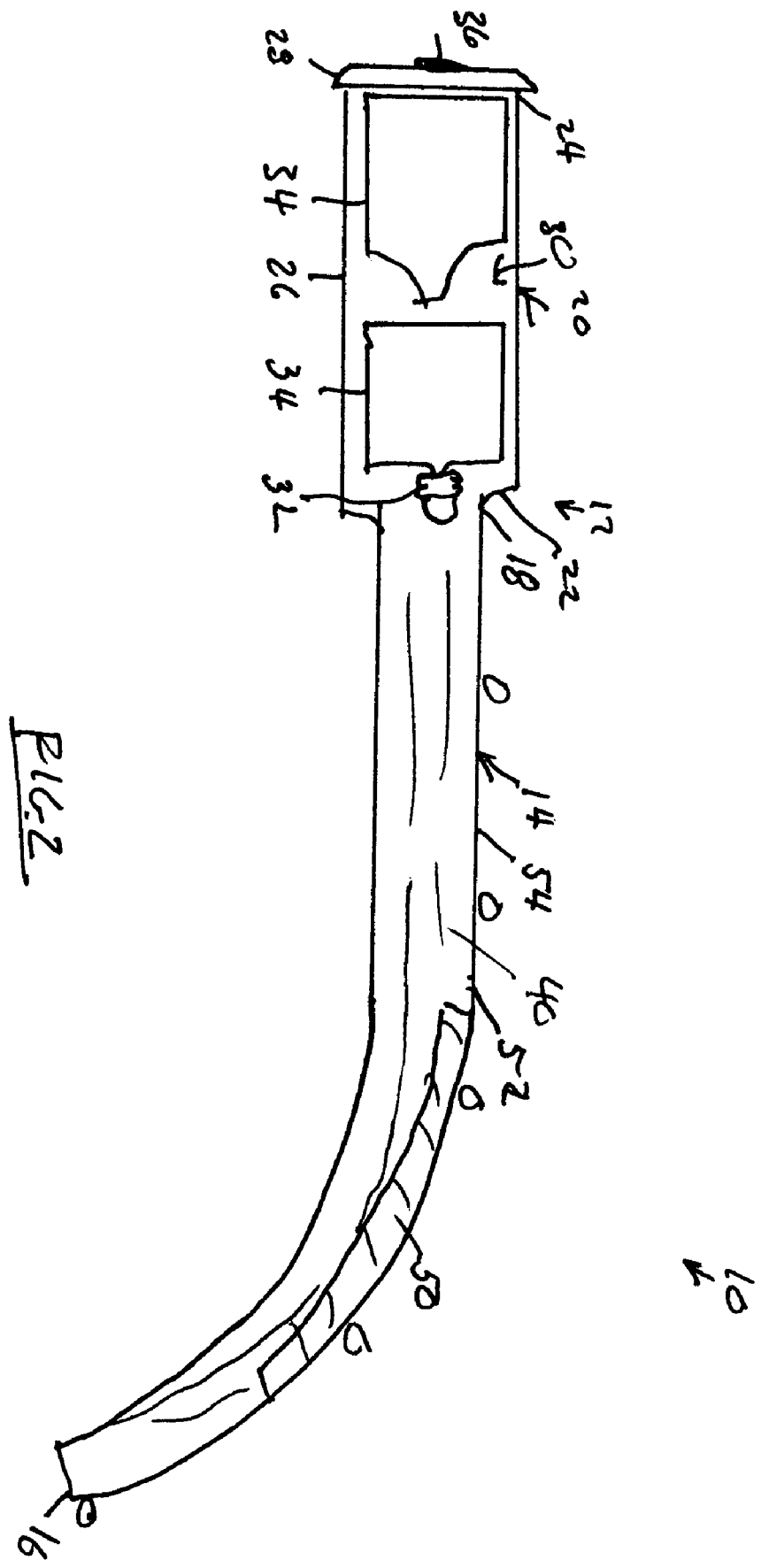
FIG. 2 is a cut-away prospective view of an additional embodiment of the present invention.
Figure 3:
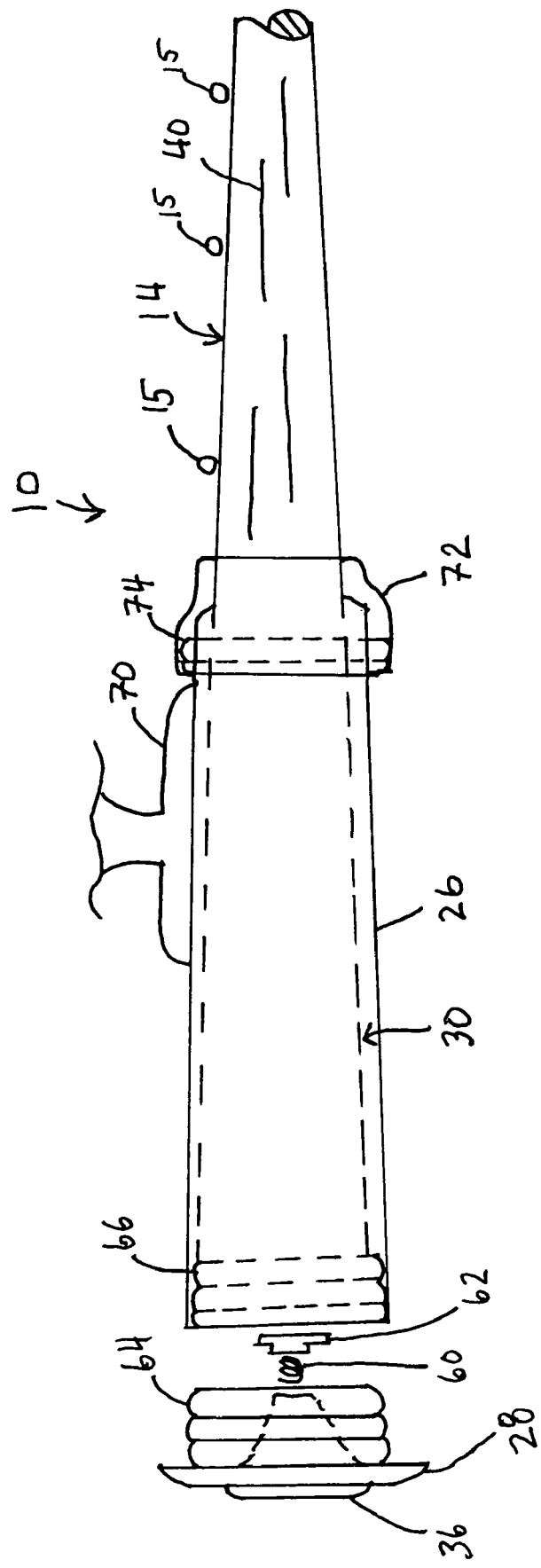
FIG. 3 is a cut-away side view of an embodiment of the handle portion of the present invention.

The attached drawing demonstrates an embodiment of the present invention. It is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein are for the purpose of description and not of limitation.

As shown in the Figures, an embodiment 10 of the present invention comprises an illuminated fishing pole 12 comprising an elongated hollow fishing rod 14 having a free end 16 and a fixed end 18. An elongated hollow handle 20 having a forward end 22 is secured to the fixed end 18 of the rod 14, and a butt end 24, wherein said elongated fishing pole 12 being made from a transparent, flexible material. A light source 30 is contained within the elongated hollow handle 20 projecting light 40 toward and through the elongated hollow fishing rod 14 and the elongated hollow handle 20. The illuminated fishing pole 12 can be constructed from a flexible material being clear or transparent in color.

The embodiment of the elongated hollow handle 20, as shown in the Figures, comprises a forward end 22 in communication with the fixed end 18 of the rod 14, a hollow body 26, and a butt end 24. The butt end has a threaded end cap 28 which is removably connected to the fixed end 18 of the fishing rod 14. The embodiment of the light source 30, as shown in the Figures, comprise a light bulb 32 connected to one or more batteries 34; and an on/off switch 36.

This embodiment illustrates a removable cap to allow access for one or more batteries 34 to be inserted within handle 20. It is understood by those skilled in the art that other configurations for the placement of and insertion of one or more batteries 34. For instance, the handle 20 could have a side opening to allow the batteries 34 to be inserted from the said, as opposed to the end of the handle 20. The use of an end cap 28 is not meant to be limiting.

An additional embodiment of the fishing rod 14 includes a reflective material 50 positioned along the interior side 52 of the fishing rod walls 54. The reflective material 50 is located proximate said free end 16 of the fishing rod 14 to facilitate the illumination of the rod 14 when it is bent due to the pull by a fish. The reflective material 50 can be placed anywhere along the interior side 52 of the fishing rod walls 54. However, the reflective material 50 is perferredly placed toward the free end 16 of the fishing rod 14. More specifically, in a fishing rod which has 5 eyes for the fishing line to be strung, the preferred location for the reflective material 50 to be placed would be between the third and fifth eye.

Figure 4:
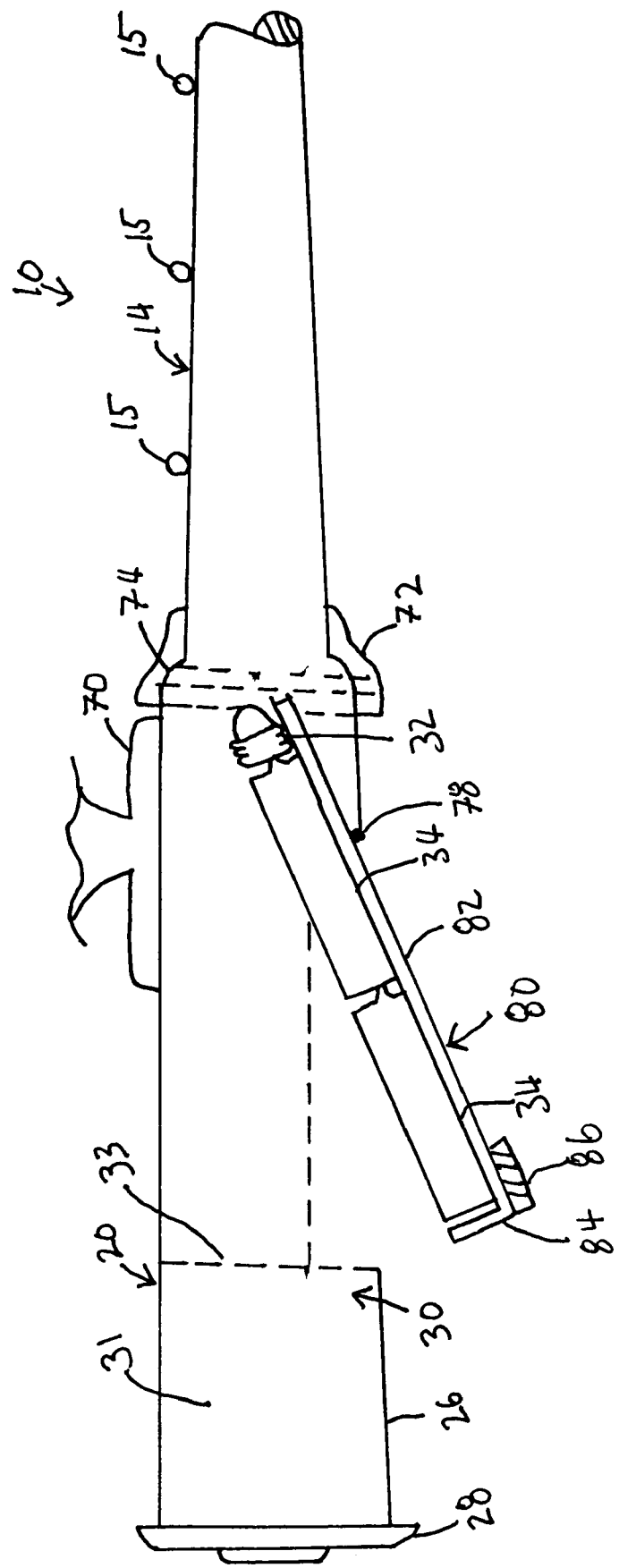
FIG. 4 is a cut-away side view of an additional embodiment of the handle portion of the present invention
Figure 5:
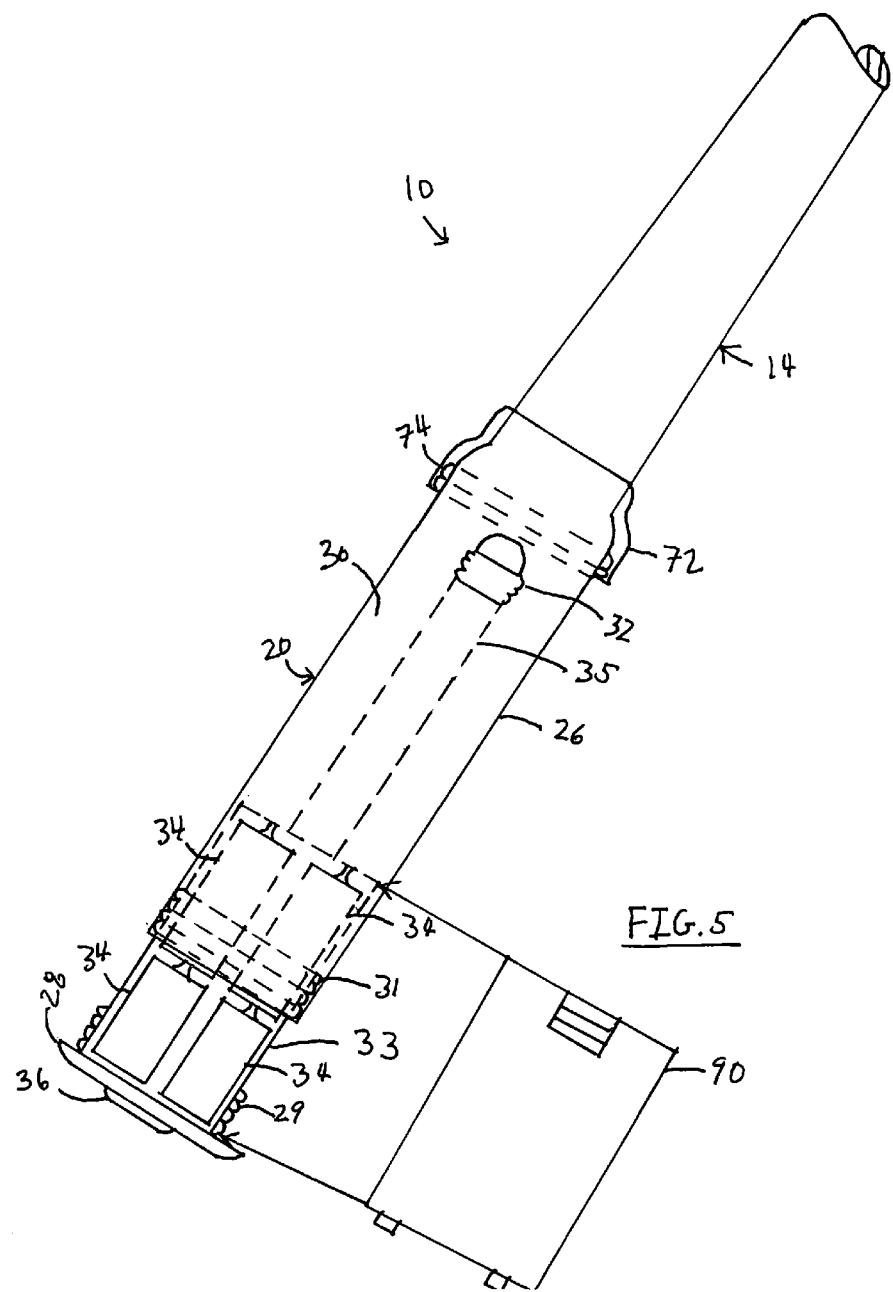
FIG. 5 is a cut-away side view of an additional embodiment of the handle portion of the present invention
Figure 6:
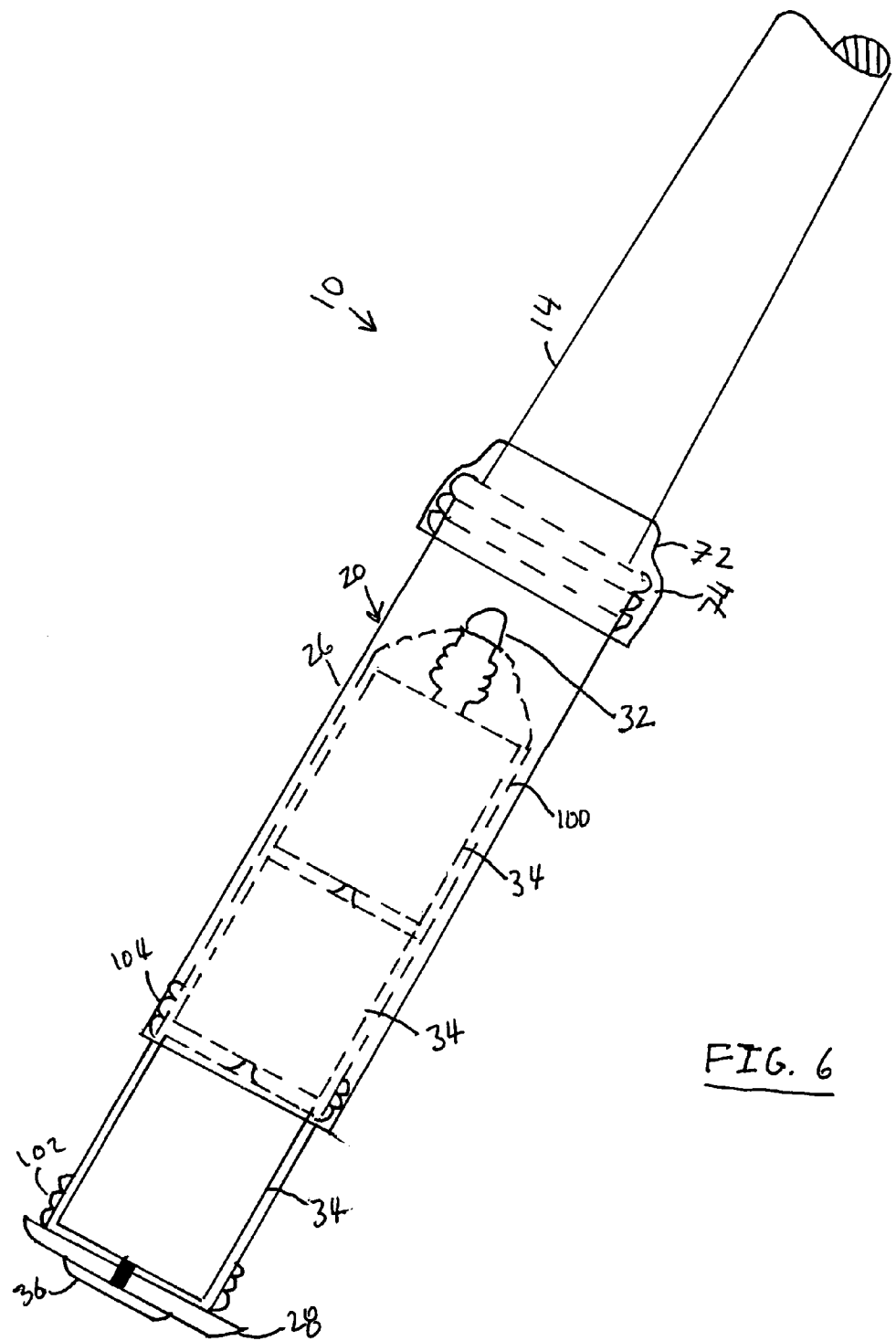
FIG. 6 is a cut-away side view of an additional embodiment of the handle portion of the present invention

Additional embodiments of the elongated hollow handle 20 are shown in FIGS. 4-6. One embodiment, as illustrated in FIG. 4, shows elongated hollow handle 20 having battery tray 80 pivotably connected thereto by a pivot connector 78. Located within battery tray 80 are batteries 34 and light bulb 32. A battery tray latch 84 secures battery tray 80 to elongated hollow handle 20. A on/off switch 86 is located along battery tray 80. Additionally, a battery storage space 31 is located within elongated hollow handle 20. These space allows for the storage of extra batteries.

An additional embodiment of elongated hollow handle 20 is illustrated in FIG. 5. This embodiment includes battery cylinder 33 having a plurality of batteries 34 therein. A battery cylinder cover 90 secures the plurality of batteries 34 within the battery cylinder 33. Battery cylinder 33 is removably secured to elongated hollow handle 20 by way of a threads as shown as male threads 29 and female threads 31. Extending from battery cylinder 33 is a light extension 35 having a light bulb 32 on its distal end.

Yet an additional embodiment of elongated hollow handle 20 is illustrated in FIG. 6. This embodiment includes a battery cylinder 100 having a plurality of batteries 34 therein. Battery cylinder 100 is removably secured to elongated hollow handle 20 by way of a threads as shown as male threads 102 and female threads 104. Located with the distal end of battery cylinder 100 is a light bulb 32.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification.

The invention claimed is:

1. An illuminated fishing pole comprising:
   an elongated hollow fishing rod having a free end and a fixed end; an elongated hollow handle having a forward end secured to the fixed end of said elongated hollow fishing rod, and a butt end, wherein said elongated hollow fishing rod and said elongated hollow handle are being made from a transparent, flexible material; and a light source contained within said elongated hollow handle projecting light toward and through said elongated hollow fishing rod and said elongated hollow handle.

2. The illuminated fishing pole of claim 1 wherein said pole is constructed from flexible material being clear in color.

3. The illuminated fishing pole of claim 1 wherein said elongated hollow handle comprises:
   a forward end in communication with said fixed end of said elongated hollow fishing rod;
   a hollow body; and
   a butt end having a threaded end cap removeably connected to said fixed end of said elongated hollow fishing rod.

4. The illuminated fishing pole of claim 3 wherein said light source is completely encased by said elongated hollow handle and comprises:
   a light bulb connected to one or more batteries; and
   an on/off switch.

5. The illuminated fishing pole of claim 1 wherein said elongated hollow fishing rod further comprises a reflective material being located along the interior side of its walls and proximate said free end of said elongated hollow fishing rod to facilitate the illumination of said elongated hollow fishing rod when said rod is bent due to the pull by a fish.

* * * * *